(12) United States Patent
Narasiyappa et al.

(10) Patent No.: US 12,508,247 B2
(45) Date of Patent: Dec. 30, 2025

(54) CONTROLLED RELEASE INJECTABLE ONDANSETRON FORMULATIONS

(71) Applicant: SHILPA MEDICARE LIMITED, Raichur (IN)

(72) Inventors: Purushothama Narasiyappa, Bengaluru (IN); Kiran Kumar Cherukuri, Bengaluru (IN); Vivek Vijaya Kumar Joshi, Bengaluru (IN); Pradeep Shivakumar, Bengaluru (IN); Sreenivasa Reddy, Bengaluru (IN)

(*) Notice: Subject to any disclaimer, the term of this patent is extended or adjusted under 35 U.S.C. 154(b) by 760 days.

(21) Appl. No.: 17/763,205

(22) PCT Filed: Sep. 30, 2020

(86) PCT No.: PCT/IB2020/059122
§ 371 (c)(1),
(2) Date: Mar. 24, 2022

(87) PCT Pub. No.: WO2021/064580
PCT Pub. Date: Apr. 8, 2021

(65) Prior Publication Data
US 2022/0354828 A1    Nov. 10, 2022

(30) Foreign Application Priority Data
Oct. 1, 2019   (IN) .............................. 201941039622

(51) Int. Cl.
| A61K 31/4178 | (2006.01) |
| A61K 9/00 | (2006.01) |
| A61K 9/1272 | (2025.01) |
| A61K 9/16 | (2006.01) |

(52) U.S. Cl.
CPC ........ *A61K 31/4178* (2013.01); *A61K 9/0019* (2013.01); *A61K 9/1272* (2013.01); *A61K 9/1652* (2013.01)

(58) Field of Classification Search
CPC .............. A61K 31/4178; A61K 9/0019; A61K 9/1272; A61K 9/1652; A61K 9/10
See application file for complete search history.

(56) References Cited

U.S. PATENT DOCUMENTS

| 2014/0364510 A1 | 12/2014 | Lichter et al. |
| 2018/0161271 A1 | 6/2018 | Lichter et al. |

FOREIGN PATENT DOCUMENTS

| CA | 2998966 A1 * | 3/2017 | ........... A61K 9/0019 |
| WO | WO-2019091936 A1 | 5/2019 | |

OTHER PUBLICATIONS

International Search Report and Written Opinion for International Application No. PCT/IB2020/059122, mailed on Nov. 10, 2020, 8 pages.
Nguyen, T.-T.-L., et al., "Preparation of an oil suspension containing ondansetron hydrochloride as a sustained release parenteral formulation," Drug Deliv Transl Res 10(1):282-295, Springer, Germany (Feb. 2020).

* cited by examiner

*Primary Examiner* — Sarah Pihonak
*Assistant Examiner* — Mikhail O'Donnel Robinson
(74) *Attorney, Agent, or Firm* — Sterne, Kessler, Goldstein & Fox P.L.L.C.

(57) ABSTRACT

The present invention relates to a controlled release injectable ondansetron formulation comprising ondansetron or pharmaceutically acceptable salt, derivative or metabolite thereof which releases ondansetron over a period of at least 2 days period from the date of administration and the process for preparation thereof.

1 Claim, 3 Drawing Sheets

Figure 1: Mean Plasma Concentration-time profile of ondansetron following single intravenous bolus administration of ondansetron intravenously in male beagle dogs (Group 1: Dose 4 mg/dog)

Figure 2: Mean Plasma Concentration-time profile of ondansetron following single intravenous bolus administration of ondansetron intravenously in male beagle dogs (Group 2: Dose 24 mg/dog)

Figure 3: Mean Plasma Concentration-time profile of ondansetron following single intramuscular bolus administration of ondansetron injectable suspension of Example 11 (0.5 mL per site – two site administration) in male beagle dogs (Group 3: Dose 100 mg/dog).

Figure 4: Mean Plasma Concentration-time profile of ondansetron following single intramuscular bolus administration of ondansetron injectable suspension of Example 12 (0.5 mL per site – two site administration) in male beagle dogs (Group 4: Dose 100 mg/dog).

Figure 5: Mean Plasma Concentration-time profile of ondansetron following single intramuscular bolus administration of ondansetron injectable suspension of Example 11 (1 mL at one site) in male beagle dogs (Group 5: Dose 100 mg/dog).

Figure 6: Mean Plasma Concentration-time profile of ondansetron following single intramuscular bolus administration of ondansetron injectable suspension of Example 12 (1 mL at one site) in male beagle dogs (Group 6: Dose 100 mg/dog).

CONTROLLED RELEASE INJECTABLE ONDANSETRON FORMULATIONS

FIELD OF INVENTION

The present invention relates to a controlled release injectable ondansetron formulation comprising ondansetron or pharmaceutically acceptable salt, derivative or metabolite thereof which releases ondansetron over a period of at least 2 days period from the date of administration, a method for preparing the above formulation, and a method for prevention of nausea and vomiting associated with emetogenic cancer chemotherapy, radiotherapy and post operation.

BACKGROUND OF THE INVENTION

Ondansetron is a selective blocking agent of the serotonin 5-HT$_3$ receptor type and is used for the prevention of nausea and vomiting associated with highly emetogenic cancer chemotherapy, prevention of nausea and vomiting associated with initial and repeat courses of moderately emetogenic cancer chemotherapy, prevention of nausea and vomiting associated with radiotherapy in patients receiving total body irradiation, single high-dose fraction to abdomen, or daily fractions to abdomen and prevention of postoperative nausea and/or vomiting.

Ondansetron is structurally represented as

Ondansetron is administered orally in following doses;
1. Highly emetogenic cancer chemotherapy: single dose of 24 mg before the start of single-day highly emetogenic cancer chemotherapy;
2. Moderately emetogenic cancer chemotherapy: 8 mg administered 30 minutes before the start of chemotherapy, with a subsequent 8 mg dose 8 hours after the first dose, and further administration of 8 mg twice a day (12 hours apart) for 1 or 2 days after completion of chemotherapy;
3. Radiation:
   a. 8 mg administered 1 or 2 hours before each fraction of radiotherapy each day for total body irradiation,
   b. 8 mg administered 1 to 2 hours before radiotherapy, with subsequent 8 mg doses every 8 hours after first dose for 1 to 2 days after completion of radiotherapy for single high-dose fraction radiotherapy to abdomen, and
   c. 8 mg administered 1 to 2 hours before radiotherapy, with subsequent 8 mg doses every 8 hours after the first dose for each day radiotherapy for daily fractioned radiotherapy to the abdomen;
4. Postoperative nausea and vomiting: 16 mg administered one hour before induction of anaesthesia.

Intravenously ondansetron is administered at a dose of three 0.15 mg/kg for 3 doses (maximum of 16 mg per dose) for the prevention of nausea and vomiting associated with initial and repeat courses of emetogenic cancer chemotherapy and at a dose of 4 mg for prevention of postoperative nausea and vomiting.

There exists a need to develop a controlled release ondansetron injectable formulation has the merit to eliminate the need of frequent dosing.

OBJECTS OF THE INVENTION

The first object of the present invention to provide a controlled release injectable formulation containing ondansetron which provides a uniform and constant rate of release over an extended period of time.

Another object of the present invention is to provide a non-irritating parenteral formulation comprising ondansetron which is injected intramuscularly (IM) and/or subcutaneously (SC).

Further object of the present invention is to provide a controlled release injectable formulation comprising ondansetron as active ingredient which shows good syringability, injectability, no clogging or blockage of the syringe needles, good drainage, sterility and re-suspendability.

A major object of the present invention is to provide a controlled release injectable formulation of ondansetron, which is used for prevention of chemotherapy induced nausea and vomiting (CINV) and post-operative nausea and vomiting (PONV), which is able to replace the existing CINV and PONV treatment regimens that requires frequent oral and intravenous dosing daily.

The present invention aims at developing a pharmaceutical composition for intramuscular (IM) or subcutaneous (SC) administration, in a single or multiple injection sites, comprising ondansetron which is able to prevent, reduce or alleviate acute delayed and anticipatory CINV or PONV symptoms from day 1 (beginning of chemotherapy treatment) up to several days.

The invention further includes sterile injectable controlled release formulations comprising ondansetron as active ingredient in the form of ready to use suspensions.

A further approach of the present invention is to provide a fast, simple and cost-effective process for the preparation of a stable injectable pharmaceutical formulation comprising ondansetron.

The invention further includes sterile injectable suspension comprising (a) ondansetron, and (b) a vehicle for the ondansetron, which upon injection, preferably intramuscularly (IM) releases the therapeutic amounts of ondansetron over a period of at least 2 days, preferably three, four, five, six and up to seven days or more from the date of administration.

The particle size (D90) of ondansetron injectable suspension according to this invention is in the range from about 1 micron to about 30 microns which releases the ondansetron over a period of at least 2 days, preferably three, four, five, six and up to seven days or more, for example up to ten days from the date of administration.

SUMMARY OF THE INVENTION

The present invention provides a controlled release injectable ondansetron formulation comprising
  (a) ondansetron having a particle size (D90) of about 1 to 30 microns, and
  (b) one or more viscosity increasing agents,
  wherein said controlled release injectable ondansetron formulation upon administration into a subject releases ondansetron over a period of at least 2 days from the date of administration.

The present invention further provides a controlled release injectable ondansetron formulation comprising
(a) ondansetron having a particle size (D90) of about 1 to 30 microns, and
(b) one or more viscosity increasing agents,
wherein said controlled release injectable ondansetron formulation upon administration into a subject releases ondansetron over a period of about 2 days to about 10 days from the date of administration.

In another embodiment, the present invention provides a controlled release injectable ondansetron formulation comprising
(a) ondansetron having a particle size (D90) of about 1 to 30 microns, and
(b) one or more viscosity increasing agents,
wherein said controlled release injectable ondansetron formulation upon administration into a subject releases ondansetron over a period of 5 days from the date of administration.

In a further embodiment, the present invention provides a controlled release injectable ondansetron formulation comprising
(a) ondansetron having a particle size (D90) of about 1 to 30 microns, and
(b) one or more viscosity increasing agents,
wherein said controlled release injectable ondansetron formulation upon administration into a subject releases ondansetron over a period of 7 days from the date of administration.

In a still further embodiment, the present invention provides a controlled release injectable ondansetron formulation comprising
(a) ondansetron having a particle size (D90) of about 1 to 30 microns,
(b) one or more viscosity increasing agents,
(c) one or more wetting agents and
(d) one or more solvents,
wherein said controlled release injectable ondansetron formulation upon administration into a subject release ondansetron over a period of about 2 days to about 10 days from the date of administration.

In a further embodiment, the present invention provides a controlled release injectable ondansetron formulation comprising
(a) ondansetron having a particle size (D90) of about 1 to 30 microns,
(b) one or more viscosity agents selected from the group consisting of carboxymethyl cellulose or its sodium salt and hydroxypropyl methylcellulose,
(c) one or more wetting agents selected from group consisting of phosphatidyl choline and poloxamer and
(d) one or more solvents selected from group consisting of ethanol and water.

In a still further embodiment, the present invention provides a controlled release injectable ondansetron formulation comprising
(a) ondansetron having a particle size (D90) of about 1 to 30 microns,
(b) carboxymethyl cellulose or its sodium salt,
(c) phosphatidyl choline and
(d) one or more solvents.

In a further embodiment, the present invention provides a controlled release injection ondansetron formulation comprising
(a) about 20 mg/mL to about 180 mg/mL ondansetron,
(b) about 1 mg/mL to about 15 mg/mL carboxymethyl cellulose or its sodium salt,
(c) about 1 mg/mL to about 15 mg/mL phosphatidyl choline.
(d) one or more solvents selected from group consisting of ethanol and water.

In another embodiment, the present invention provides a controlled release injection ondansetron formulation comprising
(a) about 20 mg/mL to about 180 mg/mL ondansetron having a particle size (D90) of about 1 to 30 microns,
(b) about 1 mg/mL to about 15 mg/mL carboxymethyl cellulose or its sodium salt,
(c) about 1 mg/mL to about 15 mg/mL phosphatidyl choline.
(d) one or more solvents selected from group consisting of ethanol and water.

The present invention further provides a controlled release injectable ondansetron formulation consisting of
(a) 20 mg/mL to 180 mg/mL ondansetron,
(b) 1 mg/mL to 15 mg/mL carboxymethyl cellulose or its sodium salt,
(c) 1 mg/mL to 15 mg/mL phosphatidyl choline,
(d) ethanol and
(e) water.

DETAILED DESCRIPTION OF THE INVENTION

For the purpose of the invention, the controlled release injectable, intramuscular (IM) or subcutaneous (SC) formulation of ondansetron means that replaces the single dosing regimen.

Controlled release parenteral drug products according to the present invention may be available as powder for suspension, coarse or colloidal liquid suspensions.

The present invention relates to a controlled release injectable ondansetron formulation comprising ondansetron having a particle size (D90) of about 1 to 30 microns, wherein said controlled release injectable ondansetron formulation upon administration into a subject releases ondansetron over a period of at least 2 days from the date of administration, preferably three, four, five, six and up to seven days or more, for example up to ten days from the date of administration.

The controlled release injectable ondansetron formulations of the invention will include ondansetron in an amount within the range from about 10 mg/mL to about 200 mg/mL, preferably in the range from about 20 mg/mL to about 180 mg/mL, more preferably in the range from about 50 mg/mL to about 150 mg/mL, even more preferably in the range from about 75 mg/mL to about 125 mg/mL and most preferably of about 100 mg/mL.

As indicated, desired particle size (D90) of the ondansetron is essential in producing an injectable formulation having the desired controlled release properties of the ondansetron. Thus, to produce desired controlled release, the ondansetron should have a particle size (D90) within the range from about 1 to about 30 microns, preferably from about 1 to about 20 microns, and more preferably from about 1 to about 15 microns.

In one embodiment ondansetron formulation of the invention will preferably be formed from a) ondansetron; b) one or more viscosity increasing agents; c) one or more wetting agents; d) optionally one or more solvents, one or more buffers and one or more pH adjusting agents.

In another embodiment, the present invention provides a controlled release injectable ondansetron formulation comprising
  (a) ondansetron having a particle size (D90) of about 1 to 30 microns, and
  (b) one or more viscosity increasing agents,
  wherein said controlled release injectable ondansetron formulation upon administration into a subject releases ondansetron over a period of at least 2 days from the date of administration, preferably three, four, five, six and up to seven days or more, for example up to ten days from the date of administration.

In a further embodiment, the present invention relates to a controlled release injectable ondansetron formulation comprising
  (a) ondansetron having a particle size (D90) of about 1 to 30 microns, and
  (b) one or more viscosity increasing agents,
  wherein said controlled release injectable ondansetron formulation upon administration into a subject releases ondansetron over a period of at least 2 days from the date of administration.

The present invention further provides a controlled release injectable ondansetron formulation comprising
  (a) ondansetron having a particle size (D90) of about 1 to 30 microns, and
  (b) one or more viscosity increasing agents,
  wherein said controlled release injectable ondansetron formulation upon administration into a subject releases ondansetron over a period of about 2 days to about 10 days from the date of administration.

In another embodiment, the present invention provides a controlled release injectable ondansetron formulation comprising
  (a) ondansetron having a particle size (D90) of about 1 to 30 microns, and
  (b) one or more viscosity increasing agents,
  wherein said controlled release injectable ondansetron formulation upon administration into a subject releases ondansetron over a period of 5 days from the date of administration.

In a further embodiment, the present invention provides a controlled release injectable ondansetron formulation comprising
  (a) ondansetron having a particle size (D90) of about 1 to 30 microns, and
  (b) one or more viscosity increasing agents,
  wherein said controlled release injectable ondansetron formulation upon administration into a subject releases ondansetron over a period of 7 days from the date of administration.

The viscosity increasing agent is present in the range from about 0.01 mg/mL to 100 mg/mL, more preferably from in the range from about 0.1 mg/mL to about 50 mg/mL, even more preferably in the range from about 1 mg/mL to about 10 mg/mL and most preferably of about 5 mg/mL. Examples of the viscosity increasing agents for use include, but are not limited to aluminium monostearate, carboxymethyl cellulose or its sodium salt, desoxycholate sodium, gelatin, glycerol, hydroxyethyl cellulose, hydroxypropylmethyl cellulose, polyoxyethylene alkyl ethers, polyoxyethylated fatty acid, polysorbate, polyethylene glycol, polyvinyl pyrrolidone and sodium carboxymethylcellulose. The more preferred viscosity increasing agents are carboxymethyl cellulose or its sodium salt, and hydroxypropyl methylcellulose. Carboxymethyl cellulose or its sodium salt is used in the range from about 0.01 mg/mL to 100 mg/mL, more preferably from in the range from about 0.1 mg/mL to about 50 mg/mL, even more preferably in the range from about 1 mg/mL to about 15 mg/mL, even most preferably in the range of 2 mg/mL to about 10 mg/mL and most preferably of about 5 mg/mL.

Wetting agents are present in the range from about 0.01 mg/mL to 100 mg/mL, more preferably from in the range from about 0.1 mg/mL to about 50 mg/mL, even more preferably in the range from about 1 mg/mL to about 25 mg/mL, most preferably of about 1 mg/mL to about 15 mg/mL and even most preferably of about 10 mg/mL. Examples of suitable wetting agents for use include one or more of the following but not limited to phospholipids selected from group consisting of egg yolk based phospholipids (egg phosphatidyl choline), soya phosphatidylcholine; diethylene glycol monostearate, diethylene glycol monolaurate, glyceryl monostearate, polyoxyethylene sorbitol beeswax, polyethylene lauryl ether, polyoxyethylene lauryl ether, polyoxyethylene monostearate, polyoxyethylene alkyl phenol, polyethylene sorbitan monooleate, polyethylene sorbitan monolaurate, polyoxyethylene lauryl ether, potassium oleate, poloxamer, sorbitan tristearate, sorbitan monolaurate, sorbitan monooleate, sodium lauryl sulfate, sodium oleate, and triethanolamine oleate. Phosphatidyl choline is used in the range from about 0.01 mg/mL to 100 mg/mL, more preferably from in the range from about 0.1 mg/mL to about 50 mg/mL, even more preferably in the range from about 0.5 mg/mL to about 25 mg/mL, most preferably of about 0.8 mg/mL to about 20 mg/mL and even most preferably in the range of about 1 mg/mL to about 15 mg/mL. Mostly used concentration of phosphatidyl choline is 10 mg/mL.

Solvents preferably used in the present invention are pharmaceutically acceptable alcohols, acetone, acetonitrile, chloroform, dichloromethane, water or mixtures thereof. Pharmaceutically acceptable alcohols are selected from the group consisting of ethanol, benzyl alcohol, tertiary-butyl alcohol, isopropyl alcohol, and suitable mixtures thereof. Ethanol is the most preferably used alcoholic solvent. The most preferably used solvents is the mixture of ethanol and water.

In a still further embodiment, the present invention provides a controlled release injectable ondansetron formulation comprising
(a) ondansetron having a particle size (D90) of about 1 to 30 microns,
(b) one or more viscosity increasing agents,
(c) one or more wetting agents and
(d) one or more solvents,
wherein said controlled release injectable ondansetron formulation upon administration into a subject release ondansetron over a period of about 2 days to about 10 days from the date of administration.

In a further embodiment, the present invention provides a controlled release injectable ondansetron formulation comprising
(a) ondansetron having a particle size (D90) of about 1 to 30 microns,
(b) one or more viscosity agents selected from the group consisting of carboxymethyl cellulose or its sodium salt and hydroxypropyl methylcellulose,
(c) one or more wetting agents selected from group consisting of phosphatidyl choline and poloxamer and
(d) one or more solvents selected from group consisting of ethanol and water.

In a still further embodiment, the present invention provides a controlled release injectable ondansetron formulation comprising
(a) ondansetron having a particle size (D90) of about 1 to 30 microns,
(b) carboxymethyl cellulose or its sodium salt,
(c) phosphatidyl choline and
(d) one or more solvents.

In a further embodiment, the present invention provides a controlled release injection ondansetron formulation comprising
(a) about 20 mg/mL to about 180 mg/mL ondansetron,
(b) about 1 mg/mL to about 15 mg/mL carboxymethyl cellulose or its sodium salt,
(c) about 1 mg/mL to about 15 mg/mL phosphatidyl choline.
(d) one or more solvents selected from group consisting of ethanol and water.

In another embodiment, the present invention provides a controlled release injection ondansetron formulation comprising
(a) about 20 mg/mL to about 180 mg/mL ondansetron having a particle size (D90) of about 1 to 30 microns,
(b) about 1 mg/mL to about 15 mg/mL carboxymethyl cellulose or its sodium salt,
(c) about 1 mg/mL to about 15 mg/mL phosphatidyl choline.
(d) one or more solvents selected from group consisting of ethanol and water.

The present invention further provides a controlled release injectable ondansetron formulation consisting of
(a) 20 mg/mL to 180 mg/mL ondansetron,
(b) 1 mg/mL to 15 mg/mL carboxymethyl cellulose or its sodium salt,
(c) 1 mg/mL to 15 mg/mL phosphatidyl choline,
(d) ethanol and
(e) water.

In a still further embodiment, the present invention provides a controlled release injectable formulation consisting of
(a) 100 mg/mL ondansetron,
(b) 5 mg/mL carboxymethyl cellulose or its sodium salt,
(c) 10 mg/mL phosphadityl choline,
(d) ethanol and
(e) water.

A buffer may be optionally employed, in a specific amount as to adjust the pH value from about 6 to about 8. Examples of suitable buffers include: sodium phosphate and potassium phosphate. Sodium phosphate is particularly preferred as buffering agent.

The controlled release injectable solution of the present invention may optionally include one or more pH adjusting agents. The pH adjusting agents may be either an acid or a base. Examples of pH adjusting agents include one or mixture of the following: acetic acid, calcium carbonate, hydrochloric acid, magnesium oxide, magnesium hydroxide, potassium hydroxide and sodium hydroxide. Sodium hydroxide and hydrochloric acid are particularly preferred as pH adjusting agents.

Additionally, one or more tonicity adjusting agent may be optionally added. Examples of suitable tonicity adjusting agents include, but are not limited to magnesium sulfate, maltose, mannitol, polyethylene glycol, polylactic acid, polysorbate, potassium chloride, povidone, sodium chloride, sodium cholesteryl sulfate, sodium succinate, sodium sulfate, sorbitol, sucrose and trehalose. Sodium chloride is particularly preferred, when necessary, as tonicity adjusting agent.

The following examples are provided to illustrate the present invention. It is understood, however, that the invention is not limited to the specific conditions or details described in the examples below. The examples should not be construed as limiting the invention as the examples merely provide specific methodology useful in the understanding and practice of the invention and its various aspects. While certain preferred and alternative embodiments of the invention have been set forth for purposes of disclosing the invention, modification to the disclosed embodiments can occur to those who are skilled in the art.

Example 1: Ondansetron Injectable Suspension (100 mg Ondansetron/1 mL) with the Particle Size of 12.5 μm Composition:

The following ingredients are used for the preparation of the ondansetron injectable suspension.

| S. No | Ingredient | mg/mL |
|---|---|---|
| 1. | Ondansetron base | 100 |
| 2. | Carboxymethyl cellulose sodium salt | 5 |
| 3. | Poloxamer | 10 |
| 4. | Water for Injection | q.s to 1 mL |

Process for Preparation:
1. In a clean and dried vessel carboxymethyl cellulose sodium salt, poloxamer is weighed and dissolved in water for injection and further filtered 0.2μ sterile filter.
2. To the above contents of step 1 sterilized ondansetron base is added and kept under high shear mixing using inline homogenizer at 8000-15,000 rpm. Mixing is continued for about 10 to 15 minutes to form in a coarser suspension.
3. The above coarser suspension is subjected to homogenization to reduce the particle size to form the final ondansetron injectable suspension and volume is made up to 100% with water for injection.
4. After the homogenization the final ondansetron injectable suspension is evaluated for the particle size distribution by laser scattering particle distribution analyser and the ondansetron has the Particle size (D90) of 12.5 μm.

Example 2: Ondansetron Injectable Suspension (100 mg Ondansetron/1 mL) with the Particle Size of 4.25 μm Composition:
The following ingredients are used for the preparation of the ondansetron injectable suspension.

| S. No | Ingredient | mg/mL |
|---|---|---|
| 1. | Ondansetron base | 100 |
| 2. | Carboxymethyl cellulose sodium salt | 5 |
| 3. | Poloxamer | 10 |
| 4. | Water for Injection | q.s to 1 mL |

Process for Preparation:
1. In a clean and dried vessel carboxymethyl cellulose sodium salt, poloxamer is weighed and dissolved in water for injection and further filtered 0.2μ sterile filter.
2. To the above contents of step 1 sterilized ondansetron base is added and kept under high shear mixing using inline homogenizer at 8000-15,000 rpm. Mixing is continued for about 10 to 15 minutes to form a coarser suspension.
3. The above coarser suspension is subjected to homogenization to reduce the particle size to form the final ondansetron injectable suspension and volume is made up to 100% with water for injection.
4. After the homogenization the final ondansetron injectable suspension is evaluated for the particle size distribution by laser scattering particle distribution analyser and the ondansetron has the Particle size (D90) of 4.25 μm.

Example 3: Ondansetron Injectable Suspension (100 mg Ondansetron/1 mL) with the Particle Size of 5 μm Composition:
The following ingredients are used for the preparation of the ondansetron injectable suspension.

| S. No | Ingredient | mg/mL |
|---|---|---|
| 1. | Ondansetron base | 100 |
| 2. | Carboxymethyl cellulose sodium salt | 5 |
| 3. | Lipoid E 80 (Egg phospholipid with 80% Phosphatidylcholine) | 10 |
| 4. | Ethanol | 7.89 |
| 5. | Water for Injection | q.s to 1 mL |

Process for Preparation:
1. In a clean dried vessel Lipoid E 80 is dissolved in Ethanol and filtered 0.2μ sterile filter.
2. In a clean dried vessel carboxymethyl cellulose sodium salt and water for injection was added and further filtered 0.2μ sterile filter.
3. To the above contents of step 2, step 1 contents are added and stirred to homogenous dispersion.
4. To the above contents of step 3 sterilized ondansetron base is added and kept under high shear mixing using inline homogenizer at 8000-15,000 rpm. Mixing is continued for about 10 to 15 minutes to form a coarser suspension.
5. The above coarser suspension is subjected to homogenization to reduce the particle size to form the final ondansetron injectable suspension and volume is made up to 100% with water for injection.
6. After the homogenization the final ondansetron injectable suspension is evaluated for the particle size distribution by laser scattering particle distribution analyser and the ondansetron has the particle size (D90) of 5 μm.

Examples 4 to 6: Ondansetron Injectable Suspension (100 mg Ondansetron/1 mL)

Composition: An ondansetron injectable (IM Depot) suspension (100 mg/mL, 100 mg/Vial) was prepared as follows.

| S. No | Ingredient | Ex: 4 mg/mL | Ex: 5 mg/mL | Ex: 6 mg/mL |
|---|---|---|---|---|
| 1. | Ondansetron base | 100 | 100 | 100 |
| 2. | Carboxymethyl cellulose sodium salt | 5 | 5 | 5 |
| 3. | Lipoid E 80 (Egg phospholipid with 80% Phosphatidylcholine) | 2.5 | 2.5 | 5 |
| 4. | Ethanol dehydrated | 2.0 | 2.0 | 4.0 |
| 5. | Water for Injection | Q.S to 1 mL | Q.S to 1 mL | Q.S to 1 mL |
| Particle size of suspension (D90) | | 5.19 μm | 2.17 μm | 4.23 μm |

Process for Preparation:
1. In a clean and dried vessel 60% of batch size of water for injection collected.
2. To step 1, carboxymethyl cellulose sodium salt added and dissolved.
3. Step 2 solution filtered 0.2μ sterile filter.
4. In a clean and dried vessel Lipoid E 80 solubilized in Ethanol to get 500 mg/mL of Lipoid E 80 and filtered 0.4 sterile filter.
5. To step 3 solution measured quantity of step 4 solution to get 10 mg/mL of Lipoid E80 added and stirred to get homogenous dispersion.
6. To step 5 solution Ondansetron added and subjected to high shear mixing 10000 rpm for 10 min.
7. Step 6 suspension subjected to high pressure homogenization 5000 psi for 4 passes to reduce the particles to the desired size.

8. Step 7 suspension volume made up to get 100 mg/mL of Ondansetron using water for injection.

Examples 7 to 9: Ondansetron Injectable Suspension (100 mg Ondansetron/1 mL)

Composition: An ondansetron injectable (IM Depot) suspension (100 mg/mL, 100 mg/Vial) was prepared as follows.

| S. No | Ingredient | Ex: 7 mg/mL | Ex: 8 mg/mL | Ex: 9 mg/mL |
|---|---|---|---|---|
| 1. | Ondansetron base | 100 | 100 | 100 |
| 2. | Carboxymethyl cellulose sodium salt | 5 | 5 | 5 |
| 3. | Lipoid E 80 (Egg phospholipid with 80% Phosphatidylcholine) | 5 | 5 | 5 |
| 4. | Ethanol dehydrated | 4.0 | 4.0 | 4.0 |
| 5. | Water for Injection | Q.S to 1 mL | Q.S to 1 mL | Q.S to 1 mL |
| | Particle size of suspension (D90) | 8.72 μm | 4.35 μm | 4.98 μm |

The process for preparation is same as disclosed in the examples 4 to 6.

Examples 10 to 12: Ondansetron Injectable Suspension (100 mg Ondansetron/1 mL)

Composition: An ondansetron injectable (IM Depot) suspension (100 mg/mL, 100 mg/Vial) was prepared as follows.

| S. No | Ingredient | Ex: 10 mg/mL | Ex: 11 mg/mL | Ex: 12 mg/mL |
|---|---|---|---|---|
| 1. | Ondansetron base | 100 | 100 | 100 |
| 2. | Carboxymethyl cellulose sodium salt | 5 | 5 | 5 |
| 3. | Lipoid E 80 (Egg phospholipid with 80% Phosphatidylcholine) | 5 | 10 | 10 |
| 4. | Ethanol dehydrated | 4.0 | 7.89 | 7.89 |
| 5. | Water for Injection | Q.S to 1 mL | Q.S to 1 mL | Q.S to 1 mL |
| | Particle size of suspension (D90) | 9.40 μm | 12.7 μm | 4.53 μm |

The process for preparation is same as disclosed in the examples 10 to 12.

Example 13: Animal PK Data: Fasting Single Dose IM Depot Study in Dogs

Male Beagle dogs were fasted are divided into six groups as G1, G2, G3, G4, G5 and G6 each consisting of four dogs. Ondansetron injection solution 2 mg/mL available in market (Reference) is administered intravenously (IV) to G1, G2 groups and 100 mg/1 mL ondansetron injectable suspension (IM Depot) of example 11 and 12 (test) of the present invention are administered intramuscularly G3, G4, G5 and G6 groups, with the dose, dose volume, drug concentration, sites of injection as listed in Table—1.

TABLE 1

| Group | Dose formulation | Dose (mg/dog) | Dose Volume (mL/dog) | Drug Conc. (mg/mL) | Site of Injection | Route of Administration |
|---|---|---|---|---|---|---|
| G1 | Ondansetron Injection (Marketed) | 4 | 2 | 2 | NA | IV |
| G2 | Ondansetron Injection (Marketed) | 24 | 12 | 2 | NA | IV |
| G3 | Example 11 Formulation | 100 | 1 | 100 | Two Sites (0.5 mL Per Site) | IM |
| G4 | Example 12 Formulation | 100 | 1 | 100 | Two Sites (0.5 mL Per Site) | IM |
| G5 | Example 11 Formulation | 100 | 1 | 100 | One Site (biceps femoris muscle) | IM |
| G6 | Example 12 Formulation | 100 | 1 | 100 | One Site (biceps femoris muscle) | IM |

Figure 1:
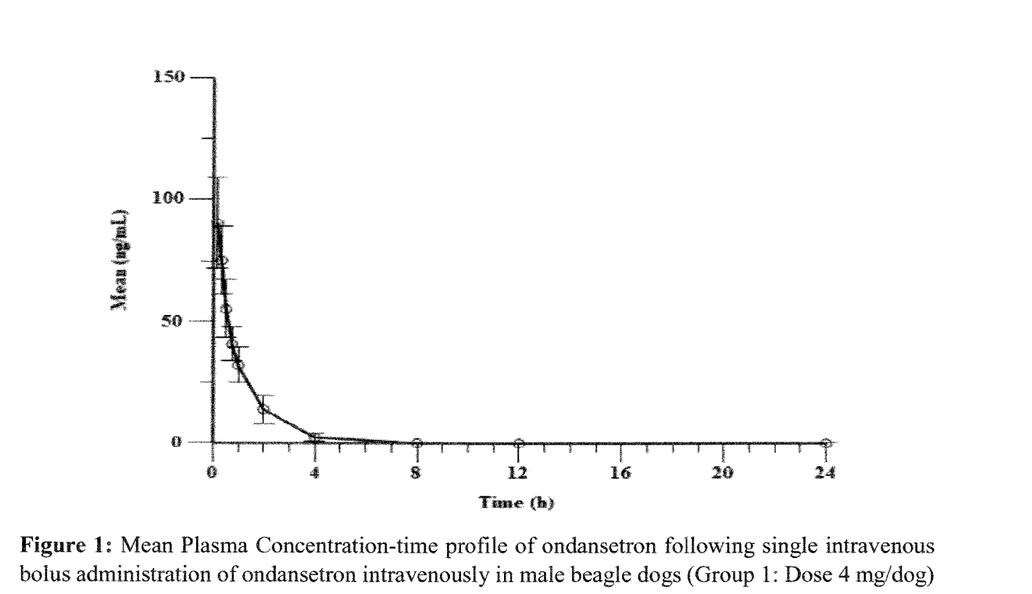
FIG. 1 shows a mean plasma concentration-time profile of ondansetron following single intravenous bolus administration of ondansetron in male beagle dogs (Group 1: Dose 4 mg/dog).
Figure 2:
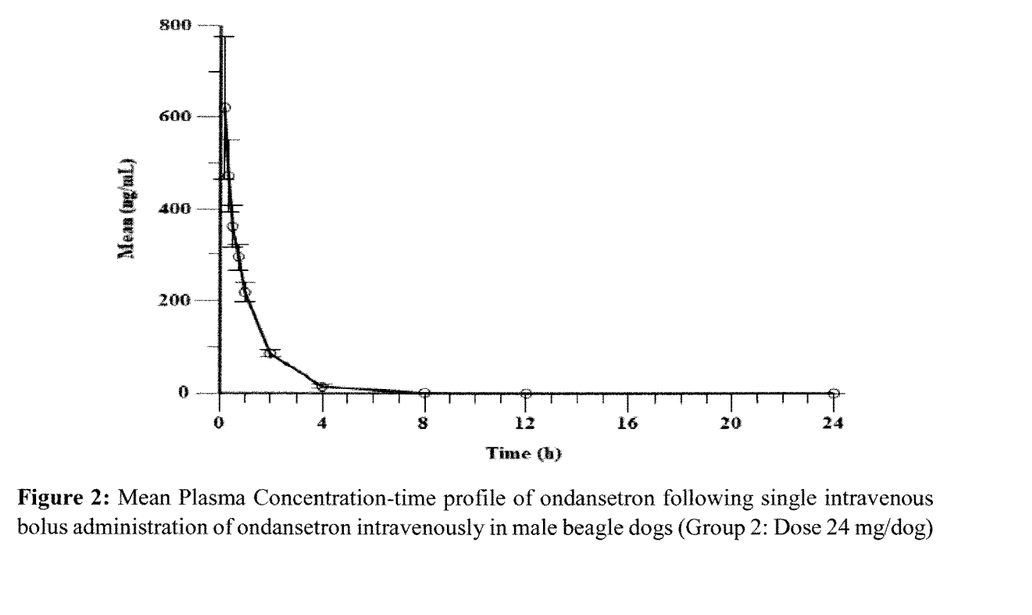
FIG. 2 shows a mean plasma concentration-time profile of ondansetron following single intravenous bolus administration of ondansetron in male beagle dogs (Group 2: Dose 24 mg/dog).
Figure 3:
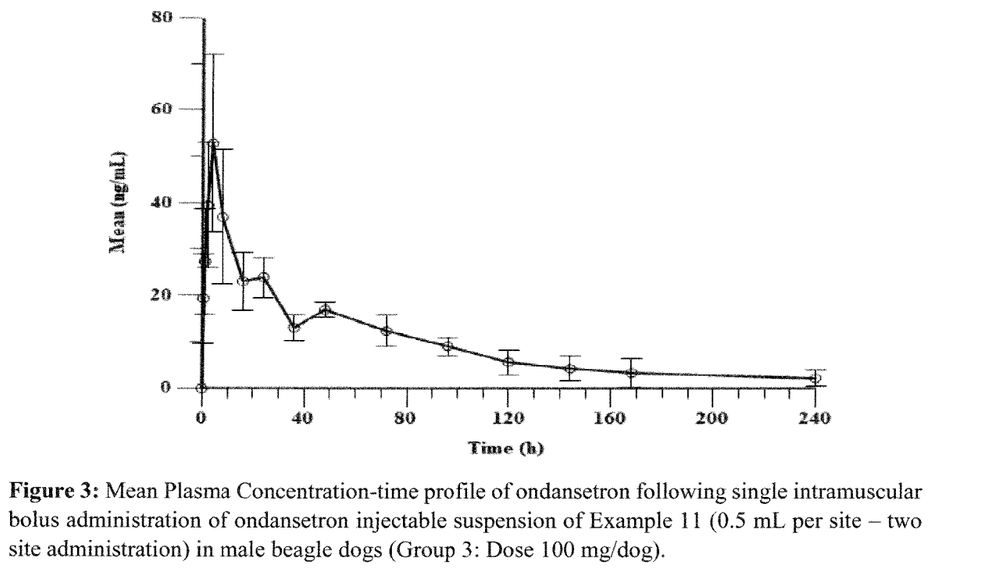
FIG. 3 shows a mean plasma concentration-time profile of ondansetron following single intramuscular bolus administration of ondansetron injectable suspension of Example 11 (0.5 mL per site-two site administration) in male beagle dogs (Group 3: Dose 100 mg/dog).
Figure 4:
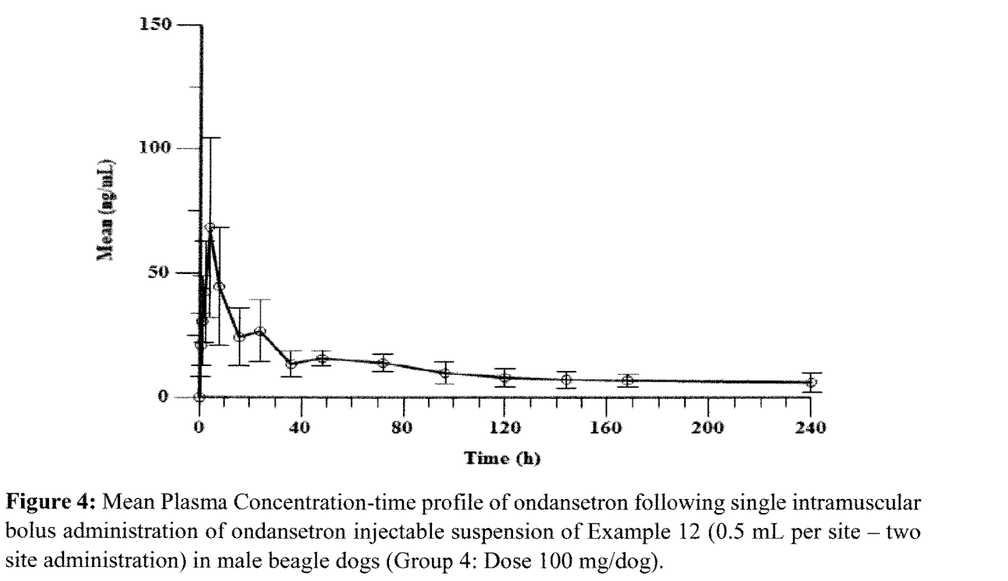
FIG. 4 shows a mean plasma concentration-time profile of ondansetron following single intramuscular bolus administration of ondansetron injectable suspension of Example 12 (0.5 mL per site-two site administration) in male beagle dogs (Group 4: Dose 100 mg/dog).
Figure 5:
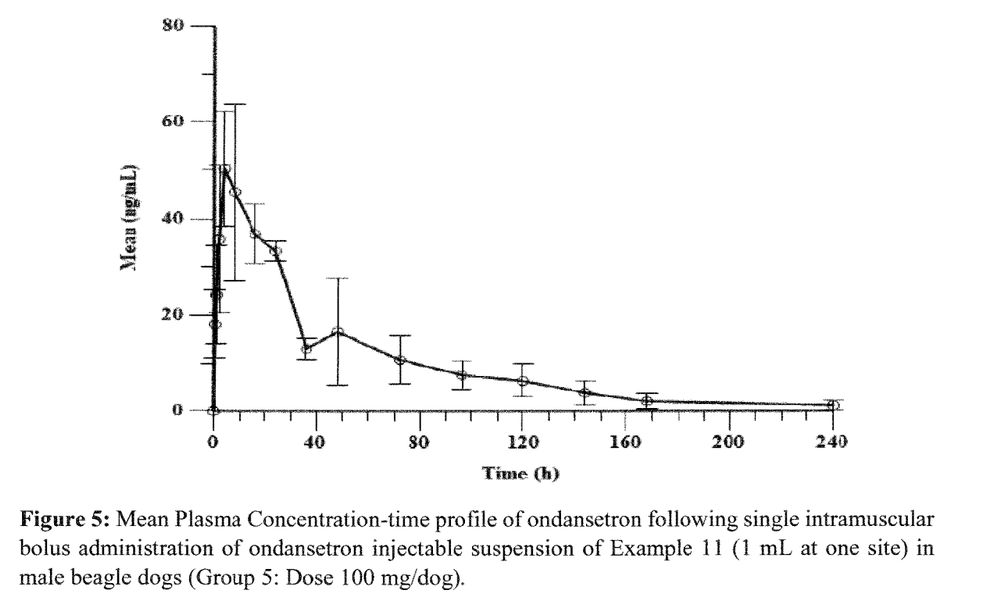
FIG. 5 shows a mean plasma concentration-time profile of ondansetron following single intramuscular bolus administration of ondansetron injectable suspension of Example 11 (1 mL at one site) in male beagle dogs (Group 5: Dose 100 mg/dog).
Figure 6:
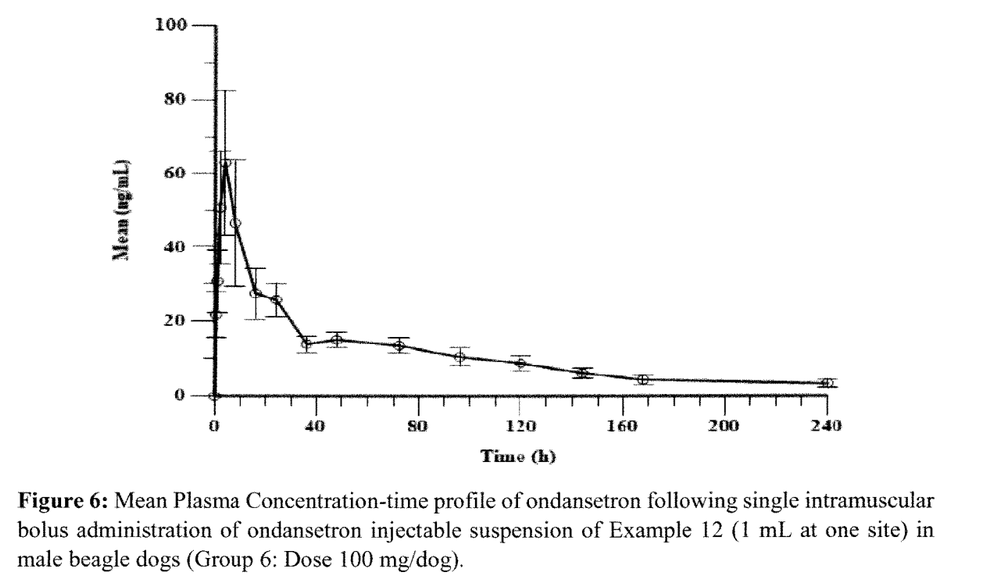
FIG. 6 shows a mean plasma concentration-time profile of ondansetron following single intramuscular bolus administration of ondansetron injectable suspension of Example 12 (1 mL at one site) in male beagle dogs (Group 6: Dose 100 mg/dog).

Blood samples were collected from each IM route dogs at 0 (pre-dose), 0.5, 1, 2, 4, 8, 16, 24, 36, 48, 72, 96, 120, 144, 168 and 240 h post-dose; for IV route dogs, blood samples were collected at 0 (pre-dose), 0.167, 0.33, 0.5, 0.75, 1, 2, 4, 8, 12 and 24 h post-dose and analysed for ondansetron in plasma and calculated using the noncompartmental analysis tool of the validated Phoenix WinNonlin software (Version 8.0). The summary of plasma pharmacokinetics parameters of ondansetron for G1 and G2 animals is summarized in Table—2 (FIGS. 1, 2) and G3, G4, G5 and G6 (FIGS. 3, 4, 5 and 6) animals is summarized in Table— 3.

TABLE 2

Summary of plasma pharmacokinetic parameters of Ondansetron (reference) on intravenous bolus administration

| Treatment | Group | Route/Dose (mg/dog) | $C_0$ (ng/mL)* | $AUC_{last}$ (ng · h/mL) | $AUC_{inf}$ (ng · h/mL) | $T_{1/2}$ (h) | CL (mL/min) | Vss (L) | MRTlast (h) |
|---|---|---|---|---|---|---|---|---|---|
| Ondansetron | G1 | IV/4 | 110 ± 27.4 | 106 ± 23.7 | 107 ± 23.4 | 0.878 ± 0.139 | 644 ± 123 | 40.3 ± 8.65 | 1.12 ± 0.217 |
| | G2 | IV/24 | 828 ± 280 | 715 ± 71.7 | 716 ± 71.5 | 1.28 ± 0.160 | 563 ± 56.1 | 36.3 ± 7.96 | 1.17 ± 0.122 |

TABLE 3

Summary of plasma pharmacokinetic parameters of Ondansetron (test) on intramuscular administration

| Treatment | Group | Route/Dose (mg/dog) | $C_{max}$ (ng/mL) | $T_{max}$ (h) | $AUC_{last}$ (ng · h/mL) | $AUC_{inf}$ (ng · h/mL) | $T_{1/2}$ (h) | MRTlast (h) |
|---|---|---|---|---|---|---|---|---|
| Ondansetron | G3 | IM/100 | 52.8 ± 19.2 | 4.00 | 2360 ± 479 | 2610 ± 819 | 64.6 ± 36.4 | 63.2 ± 13.4 |
| | G4 | IM/100 | 68.4 ± 36.1 | 4.00 | 2970 ± 555 | 4750 ± 1510 | 203 ± 158 | 79.4 ± 23.8 |
| | G5 | IM/100 | 56.4 ± 13.1 | 4.00 | 2410 ± 409 | 2500 ± 451 | 48.3 ± 14.1 | 52.6 ± 15.1 |
| | G6 | IM/100 | 62.9 ± 19.5 | 4.00 | 2780 ± 527 | 3200 ± 796 | 87.7 ± 31.5 | 69.3 ± 6.94 |

The equivalent exposure after intramuscular administration of ondansetron injectable suspension of Example 11 and Example 12 is calculated in Table—4.

TABLE 4

Equivalent exposure after intramuscular administration of Ondansetron injectable suspension of Example 11 and Example 12.

| Route | Amount Of Dose (mg) | Groups | No. of sites of inj | Stat | 0-4 h | 4-8 h | 8-24 h | 24-48 h | 48-72 h | 72-96 h | 96-120 h | 120-144 h | 144-168 h |
|---|---|---|---|---|---|---|---|---|---|---|---|---|---|
| IM | 100 | G3 | 2 sites | Mean | 5.3 | 6.7 | 16.0 | 15.1 | 13.2 | 9.7 | 6.7 | 4.5 | 3.5 |
| IM | 100 | G4 | 2 sites | Mean | 6.2 | 8.4 | 17.9 | 15.6 | 13.3 | 10.6 | 8.0 | 6.9 | 6.4 |
| IM | 100 | G5 | 1 site | Mean | 4.9 | 7.2 | 22.8 | 17.0 | 12.3 | 8.3 | 6.3 | 4.6 | 2.7 |
| IM | 100 | G6 | 1 site | Mean | 5.3 | 6.7 | 16.0 | 15.1 | 13.2 | 9.7 | 6.7 | 4.5 | 3.5 |

From it is evident that the exposure of Ondansetron release from the injectable suspension of Example 11 and 12 is extended till day 7. The exposure is higher on day 1 and continues to reduce through subsequent days and tapered off by day 7. The split AUC for durations 0 h, 4 h, 8 h and 24 h shows equivalent exposure during these durations does not indicate any burst release of the formulation at any time. The exposure of ondansetron is equivalent to between 17.0 mg and 6.3 mg between day 2 and day 5.

We claim:
1. A controlled release injectable ondansetron formulation consisting of
    (a) 20 mg/mL to 180 mg/mL ondansetron,
    (b) 1 mg/mL to 15 mg/mL carboxymethyl cellulose or its sodium salt,
    (c) 1 mg/mL to 15 mg/mL phosphatidyl choline,
    (d) ethanol and
    (e) water.

* * * * *